United States Patent [19]

Broemer et al.

[11] 3,954,484
[45] May 4, 1976

[54] FLUOROPHOSPHATE GLASS AND PROCESS OF MAKING SAME

[75] Inventors: Heinz Broemer, Hermannstein; Norbert Meinert, Bielhausen, both of Germany

[73] Assignee: Ernst Leitz G.m.b.H., Wetzlar, Germany

[22] Filed: Aug. 22, 1974

[21] Appl. No.: 499,661

[30] Foreign Application Priority Data
Aug. 23, 1973 Germany.............................. 2342484

[52] U.S. Cl............................ 106/47 Q; 106/47 R; 65/134
[51] Int. Cl.²........................................... C03C 3/00
[58] Field of Search............ 106/47 R, 47 Q; 65/134

[56] References Cited
UNITED STATES PATENTS

| | | |
|---|---|---|
| 2,430,539 | 11/1947 | Sun................................... 106/47 Q |
| 2,901,363 | 8/1959 | Pincus............................... 106/47 Q |
| 2,919,201 | 12/1959 | Izumitani.......................... 106/47 Q |
| 2,996,391 | 8/1961 | Weissenberg..................... 106/47 Q |
| 3,068,108 | 12/1962 | Geffcken .......................... 106/47 Q |
| 3,492,136 | 1/1970 | Bromer............................. 106/47 Q |
| 3,508,937 | 4/1970 | Bromer............................. 106/47 R |
| 3,597,245 | 8/1971 | Bromer............................. 106/47 Q |
| 3,656,976 | 4/1972 | Izumitani ......................... 106/47 R |
| 3,671,276 | 6/1972 | Bromer............................. 106/47 Q |
| 3,847,624 | 11/1974 | Broemer........................... 106/47 Q |

Primary Examiner—Winston A. Douglas
Assistant Examiner—John F. Niebling
Attorney, Agent, or Firm—Erich M. H. Radde

[57] ABSTRACT

A fluorophosphate glass which has an index of refraction $n_e$ of more than 1.57, an Abbe number $\nu_e$ of less than 70, and a relatively high positive anomalous partial dispersion $+\Delta\nu_e$ is provided.

16 Claims, 2 Drawing Figures

FLUOROPHOSPHATE GLASS AND PROCESS OF MAKING SAME

BACKGROUND OF THE INVENTION

1. Field of the Invention

The present invention relates to a process of producing a fluorophosphate glass and more particularly to a process of producing a fluorophosphate glass having an index of refraction $n_e$ of more than 1.57 and an Abbe number $\nu_e$ of less than 70, said glass having furthermore a relatively high positive anomalous partial dispersion $+\Delta\nu_e$, and to such a glass.

2. Description of the Prior Art

It is known to produce, by melting, glasses being based on metaphosphates of Group II and Group III of the periodic system with the addition of simple and/or complex inorganic fluorides, said glasses having a positive anomalous partial dispersion.

Thus there is known from U.S. Pat. No. 3,492,136 a process for the manufacture of a fluorophosphate glass the starting mixture of which, in addition to calcium and/or aluminum metaphosphate, also contains alkaline earth metal fluorides and one of the compounds potassium meta-arsenate, potassium heptafluoro tantalate, or, respectively, potassium hexafluoro titanate. The glass produced by this known process have indices of refraction $n_e$ between 1.53 and 1.55. Such indices must be considered relatively high for this type of glass. Furthermore, U.S. Pat. No. 3,671,276 discloses an improvement in the process described in U.S. Pat. No. 3,492,136 by which fluorophosphate glasses having indices of refraction $n_e$ between 1.50 and 1.56 can be produced.

Thus according to these known processes it was possible to produce optical fluorophosphate glasses of medium to low dispersion — corresponding to a medium to high Abbe number $\nu_e$ — and of indices of refraction $n_e$ between 1.53 and 1.56. Such glasses, furthermore, exhibit a positive anomalous partial dispersion $+\Delta\nu_e$.

It is, however, of interest with respect to certain fields of use in the optical industry to provide glasses of even higher refractive values $n_e > 1.57$ and of optimum dispersion, but which meet the requirements of the calculating optician, namely requiring that such glasses also retain, or at least only slightly reduce, their positive anomalous partial dispersion values. Such glasses, heretofore, have not been produced.

SUMMARY OF THE INVENTION

It is one object of the present invention to provide glasses having not only an index of refraction $n_e$ which exceeds the index of 1.57 and an Abbe number $\nu_e$ lower than 70, but also having a relatively high positive anomalous partial dispersion $+\Delta\nu_e$.

Another object of the present invention is to provide a process of producing such glasses with a high index of refraction, a low Abbe number, and a high positive anomalous partial dispersion.

Other objects of the present invention and advantageous features thereof will become apparent as the description proceeds.

In principle these objects are achieved in accordance with the present invention by producing glasses by melting a glass component mixture of the following components, in weight percent:

a.

0.1 % to 1.5 % of magnesium fluoride $MgF_2$,
0.1 % to 1.5 % of calcium fluoride $CaF_2$,
up to 15.0 % of strontium fluoride $SrF_2$,
up to 25.0 % of barium fluoride $BaF_2$,
up to 10.0 % of aluminum fluoride $AlF_3$, and
0.1 % to 1.5 % of lanthanum fluoride $LaF_3$, the total amount of the alkaline earth metal fluorides to be used not exceeding about 38 % and the total amount of all the fluorides used not exceeding about 45 %;

b.

8.0 % to 12.0 % of aluminum metaphosphate $Al(PO_3)_3$,
3.0 % to 25.0 % of magnesium metaphosphate $Mg(PO_3)_2$,
10.0 % to 18.0 % of barium metaphosphate $Ba(PO_3)_2$, the total amount of the metaphosphates used not exceeding about 50 %;

c.

8.0 % to 55.0 % of barium oxide BaO;

d.

up to 17.0 % of boron trioxide $B_2O_3$,
up to 10.0 % of germanium dioxide $GeO_2$,
up to 4.0 % of titanium dioxide $TiO_2$, and
up to 20.0 % of niobium pentoxide $Nb_2O_5$.

It is also possible to produce glasses according to the present invention by melting a mixture consisting of the following components, in weight percent:

a.

0.4 % to 0.5 % of magnesium fluoride $MgF_2$,
0.5 % to 0.6 % of calcium fluoride $CaF_2$,
up to 13.0 % of strontium fluoride $SrF_2$,
up to 22.0 % of barium fluoride $BaF_2$,
up to 8.0 % of aluminum fluoride $AlF_3$, and
0.5 % to 0.6 % of lanthanum fluoride $LaF_3$, the total amount of the alkaline earth metal fluorides to be used not exceeding about 35 % and the total amount of all the fluorides used not exceeding about 43 %;

b.

9.0 % to 10.0 % of aluminum metaphosphate $Al(PO_3)_3$,
4.0 % to 23.0 % of magnesium metaphosphate $Mg(PO_3)_2$,
11.0 % to 15.0 % of barium metaphosphate $Ba(PO_3)_2$, the total amount of the metaphosphates used not exceeding about 47 %;

c.

10.0 % to 52.0 % of barium oxide BaO;

d.

up to 15.0 % boron trioxide $B_2O_3$,
up to 8.0 % of germamium dioxide $GeO_2$,
up to 2.0 % of titanium dioxide $TiO_2$, and
up to 18.0 % of niobium pentoxide $Nb_2O_5$.

According to a preferred embodiment of the present invention the mixture of glass components to yield a glass of the present invention may consist of the following agents, in weight percent:

a.

0.44 % of magnesium fluoride $MgF_2$,
0.53 % of calcium fluoride $CaF_2$,
up to 12.2 % of strontium fluoride $SrF_2$,
up to 21.5 % of barium fluoride $BaF_2$,
up to 7.5 % of aluminum fluoride $AlF_3$,
0.53 % of lanthanum fluoride $LaF_3$,
the total amount of the alkaline earth metal fluorides used not being less than 0.97 % and not exceeding 34.67 %, and the total amount of all the fluorides used not being less than 1.5 % and not exceeding 42.7 %;

b.

9.3 % of aluminum metaphosphate $Al(PO_3)_3$,
4.5 % to 22.5 % of magnesium metaphosphate $Mg(PO_3)_2$,
11.8 % to 14.8 % of barium metaphosphate $Ba(PO_3)_2$,
the total amount of the metaphosphates used not being less than 28.6 % and not exceeding 46.6 %;

c.

10.7 % to 51.9 % of barium oxide BaO;

d.

up to 15.0 % of boron trioxide $B_2O_3$,
up to 7.5 % of germanium dioxide $GeO_2$,
up to 1.5 % of titanium dioxide $TiO_2$, and
up to 18.0 % of niobium pentoxide $Nb_2O_5$.

BRIEF DESCRIPTION OF THE DRAWINGS

In the accompanying drawings, the particular optical parameters of glasses produced according to the present invention are shown. In said drawings.

DESCRIPTION OF THE PREFERRED EMBODIMENTS

Fluorophosphate glasses according to the present invention are produced, for instance, by melting mixtures composed as listed in the following Table but not limited to the amounts of components as given therein. The amounts given in the Table are amounts in weight percent.

| Melt No.: | 1 | 2 | 3 | 4 | 5 | 6 | 7 | 8 | 9 |
|---|---|---|---|---|---|---|---|---|---|
| $Mg(PO_3)_2$ | 22.50 | 22.50 | 22.50 | 22.50 | 22.50 | 22.50 | 22.50 | 22.50 | 22.50 |
| $Ba(PO_3)_2$ | 14.80 | 14.80 | 14.80 | 14.80 | 14.80 | 14.80 | 14.80 | 14.80 | 14.80 |
| $Al(PO_3)_3$ | 9.30 | 9.30 | 9.30 | 9.30 | 9.30 | 9.30 | 9.30 | 9.30 | 9.30 |
| $MgF_2$ | 0.44 | 0.44 | 0.44 | 0.44 | 0.44 | 0.44 | 0.44 | 0.44 | 0.44 |
| $CaF_2$ | 0.53 | 0.53 | 0.53 | 0.53 | 0.53 | 0.53 | 0.53 | 0.53 | 0.53 |
| $SrF_2$ | 12.20 | 12.20 | 12.20 | 12.20 | 12.20 | 12.20 | 12.20 | 12.20 | 9.20 |
| $BaF_2$ | 21.50 | 18.50 | 15.50 | 12.50 | 9.50 | 6.50 | 3.50 | — | — |
| $AlF_3$ | 7.50 | 7.50 | 7.50 | 7.50 | 7.50 | 7.50 | 7.50 | 7.50 | 7.50 |
| $LaF_3$ | 0.53 | 0.53 | 0.53 | 0.53 | 0.53 | 0.53 | 0.53 | 0.53 | 0.53 |
| BaO | 10.70 | 13.70 | 16.70 | 19.70 | 22.70 | 25.70 | 28.70 | 32.20 | 35.20 |
| $B_2O_3$ | — | — | — | — | — | — | — | — | — |
| $GeO_2$ | — | — | — | — | — | — | — | — | — |
| $TiO_2$ | — | — | — | — | — | — | — | — | — |
| $Nb_2O_5$ | — | — | — | — | — | — | — | — | — |
| $n_e$ | 1.5753 | 1.5763 | 1.5766 | 1.5781 | 1.5801 | 1.5820 | 1.5845 | 1.5878 | 1.5928 |
| $v_e$ | 69.6 | 69.6 | 69.7 | 69.5 | 68.8 | 68.7 | 68.8 | 68.4 | 67.6 |
| $\Delta v_e$ | +10.9 | +10.4 | +10.6 | +9.3 | +6.6 | +8.2 | +8.1 | +9.0 | +7.0 |
| $\theta'_g$ | 0.4836 | 0.4828 | 0.4833 | 0.4814 | 0.4786 | 0.4808 | 0.4808 | 0.4825 | 0.4809 |

| Melt No.: | 10 | 11 | 12 | 13 | 14 | 15 | 16 | 17 | 18 | 15a |
|---|---|---|---|---|---|---|---|---|---|---|
| $Mg(PO_3)_2$ | 22.50 | 22.50 | 22.50 | 22.50 | 22.50 | 22.50 | 22.50 | 22.50 | 22.50 | 22.50 |
| $Ba(PO_3)_2$ | 14.80 | 14.80 | 14.80 | 14.80 | 14.80 | 14.80 | 14.80 | 14.80 | 14.80 | 14.80 |
| $Al(PO_3)_3$ | 9.30 | 9.30 | 9.30 | 9.30 | 9.30 | 9.30 | 9.30 | 9.30 | 9.30 | 9.30 |
| $MgF_2$ | 0.44 | 0.44 | 0.44 | 0.44 | 0.44 | 0.44 | 0.44 | 0.44 | 0.44 | 0.44 |
| $CaF_2$ | 0.53 | 0.53 | 0.53 | 0.53 | 0.53 | 0.53 | 0.53 | 0.53 | 0.53 | |
| $SrF_2$ | 6.20 | 3.20 | — | — | — | — | 12.20 | 12.20 | 12.20 | — |
| $BaF_2$ | — | — | — | — | — | — | — | — | — | — |
| $AlF_3$ | 7.50 | 7.50 | 7.50 | 4.50 | 2.00 | — | 7.50 | 7.50 | 7.50 | 1.00 |
| $LaF_3$ | 0.53 | 0.53 | 0.53 | 0.53 | 0.53 | 0.53 | 0.53 | 0.53 | 0.53 | 0.53 |
| BaO | 38.20 | 41.20 | 44.40 | 47.40 | 49.90 | 51.90 | 31.70 | 31.20 | 30.70 | 50.90 |
| $B_2O_3$ | — | — | — | — | — | — | — | — | — | — |
| $GeO_2$ | — | — | — | — | — | — | — | — | — | — |
| $TiO_2$ | — | — | — | — | — | — | 0.50 | 1.00 | 1.50 | — |
| $Nb_2O_5$ | — | — | — | — | — | — | — | — | — | — |
| $n_e$ | 1.5963 | 1.6012 | 1.6073 | 1.6175 | 1.6267 | — | 1.5926 | 1.5931 | 1.5986 | 1.6107 |
| $v_e$ | 67.2 | 66.4 | 65.7 | 64.3 | 62.7 | — | 65.7 | 63.7 | 61.4 | 64.65 |
| $\Delta v_e$ | +6.9 | +7.5 | +5.5 | +6.1 | +5.6 | — | +9.1 | +8.7 | +8.3 | +9.5 |
| $\theta'_g$ | 0.4813 | 0.4833 | 0.4815 | 0.4843 | 0.4859 | — | 0.4866 | 0.4888 | 0.4916 | 0.4887 |

| Melt No.: | 19 | 20 | 21 | 22 | 23 | 24 | 25 | 26 | 27 | |
|---|---|---|---|---|---|---|---|---|---|---|
| $Mg(PO_3)_2$ | 22.50 | 22.50 | 22.50 | 22.50 | 19.50 | 16.50 | 13.50 | 10.50 | 7.50 | |
| $Ba(PO_3)_2$ | 14.80 | 14.80 | 14.80 | 14.80 | 14.80 | 14.80 | 14.80 | 14.80 | 14.80 | |
| $Al(PO_3)_3$ | 9.30 | 9.30 | 9.30 | 9.30 | 9.30 | 9.30 | 9.30 | 9.30 | 9.30 | |
| $MgF_2$ | 0.44 | 0.44 | 0.44 | 0.44 | 0.44 | 0.44 | 0.44 | 0.44 | 0.44 | |
| $CaF_2$ | 0.53 | 0.53 | 0.53 | 0.53 | 0.53 | 0.53 | 0.53 | 0.53 | 0.53 | 0.53 |
| $SrF_2$ | 12.20 | 12.20 | 12.20 | 12.20 | 12.20 | 12.20 | 12.20 | 12.20 | 12.20 | |
| $BaF_2$ | — | — | — | — | — | — | — | — | — | |
| $AlF_3$ | 7.50 | 7.50 | 7.50 | 7.50 | 7.50 | 7.50 | 7.50 | 7.50 | 7.50 | |
| $LaF_3$ | 0.53 | 0.53 | 0.53 | 0.53 | 0.53 | 0.53 | 0.53 | 0.53 | 0.53 | |
| BaO | 29.20 | 26.20 | 27.70 | 29.20 | 32.20 | 32.20 | 32.20 | 32.20 | 32.20 | |
| $B_2O_3$ | — | — | — | — | — | — | — | — | — | |
| $GeO_2$ | 3.00 | 6.00 | 4.50 | — | — | — | — | — | — | |

-continued

| Melt No.: | 19 | 20 | 21 | 22 | 23 | 24 | 25 | 26 | 27 |
|---|---|---|---|---|---|---|---|---|---|
| $TiO_2$ | — | — | — | — | — | — | — | — | — |
| $Nb_2O_5$ | — | — | — | 3.00 | 3.00 | 6.00 | 9.00 | 12.00 | 15.00 |
| $n_e$ | 1.5915 | 1.5934 | 1.5922 | 1.5974 | 1.6005 | 1.6130 | 1.6285 | 1.6473 | 1.6676 |
| $\nu_e$ | 67.7 | 67.1 | 67.2 | 62.7 | 62.2 | 57.5 | 53.0 | 48.8 | 45.0 |
| $\Delta\nu_e$ | +9.5 | +10.2 | +6.5 | +5.1 | +6.2 | +5.5 | +4.8 | +6.3 | +6.5 |
| $\theta'_g$ | 0.4843 | 0.4862 | 0.4807 | 0.4852 | 0.4874 | 0.4932 | 0.4999 | 0.5066 | 0.5123 |

| Melt No.: | 28 | 29 | 30 | 31 | 32 | 33 | 34 | 35 | 34a | 35a |
|---|---|---|---|---|---|---|---|---|---|---|
| $Mg(PO_3)_2$ | 4.50 | 7.50 | 19.50 | 19.50 | 16.50 | 13.50 | 10.50 | 7.50 | 13.50 | 13.50 |
| $Ba(PO_3)_2$ | 14.80 | 11.80 | 14.80 | 14.80 | 14.80 | 14.80 | 14.80 | 14.80 | 14.80 | 14.80 |
| $Al(PO_3)_3$ | 9.30 | 9.30 | 9.30 | 9.30 | 9.30 | 9.30 | 9.30 | 9.30 | 9.30 | 9.30 |
| $MgF_2$ | 0.44 | 0.44 | 0.44 | 0.44 | 0.44 | 0.44 | 0.44 | 0.44 | 0.44 | 0.44 |
| $CaF_2$ | 0.53 | 0.53 | 0.53 | 0.53 | 0.53 | 0.53 | 0.53 | 0.53 | 0.53 | 0.53 |
| $SrF_2$ | 12.20 | 12.20 | 12.20 | 12.20 | 12.20 | 12.20 | 12.20 | 12.20 | 9.20 | 6.20 |
| $BaF_2$ | — | — | — | — | — | — | — | — | — | — |
| $AlF_3$ | 7.50 | 7.50 | 7.50 | 7.50 | 7.50 | 7.50 | 7.50 | 7.50 | 7.50 | 7.50 |
| $LaF_3$ | 0.53 | 0.53 | 0.53 | 0.53 | 0.53 | 0.53 | 0.53 | 0.53 | 0.53 | 0.53 |
| $BaO$ | 32.20 | 32.20 | 27.70 | 32.20 | 32.20 | 32.20 | 32.20 | 32.20 | 32.20 | 32.20 |
| $B_2O_3$ | — | — | — | 3.00 | 6.00 | 9.00 | 12.00 | 15.00 | 12.00 | 15.00 |
| $GeO_2$ | — | — | 7.50 | — | — | — | — | — | — | — |
| $TiO_2$ | — | — | — | — | — | — | — | — | — | — |
| $Nb_2O_5$ | 18.00 | 18.00 | — | — | — | — | — | — | — | — |
| $n_e$ | 1.6910 | 1.6915 | 1.5949 | 1.6031 | 1.6049 | 1.6055 | — | — | 1.6077 | 1.6056 |
| $\nu_e$ | 41.5 | 41.2 | 65.8 | 66.2 | 66.4 | 65.9 | — | — | 64.08 | 64.52 |
| $\Delta\nu_e$ | +5.2 | +6.4 | +5.5 | +6.6 | +8.9 | +5.0 | — | — | +4.5 | +3.5 |
| $\theta'_g$ | 0.5155 | 0.5175 | 0.4812 | 0.4823 | 0.4881 | 0.4803 | — | — | 0.4823 | 0.4801 |

As shown by the examples given in the Table, glasses having high refraction values $n_e > 1.57$ and Abbe numbers $\nu_e$ between 70 and 41 are obtained. Such glasses retain surprisingly relatively high positive anomalous partial dispersion values $+\Delta\nu_e$ due to providing, in addition to metaphosphates, also fluorides of bivalent or trivalent metals and oxides of bivalent to pentavalent elements as components of the mixtures in the ranges indicated and claimed hereinafter.

Figure 1:
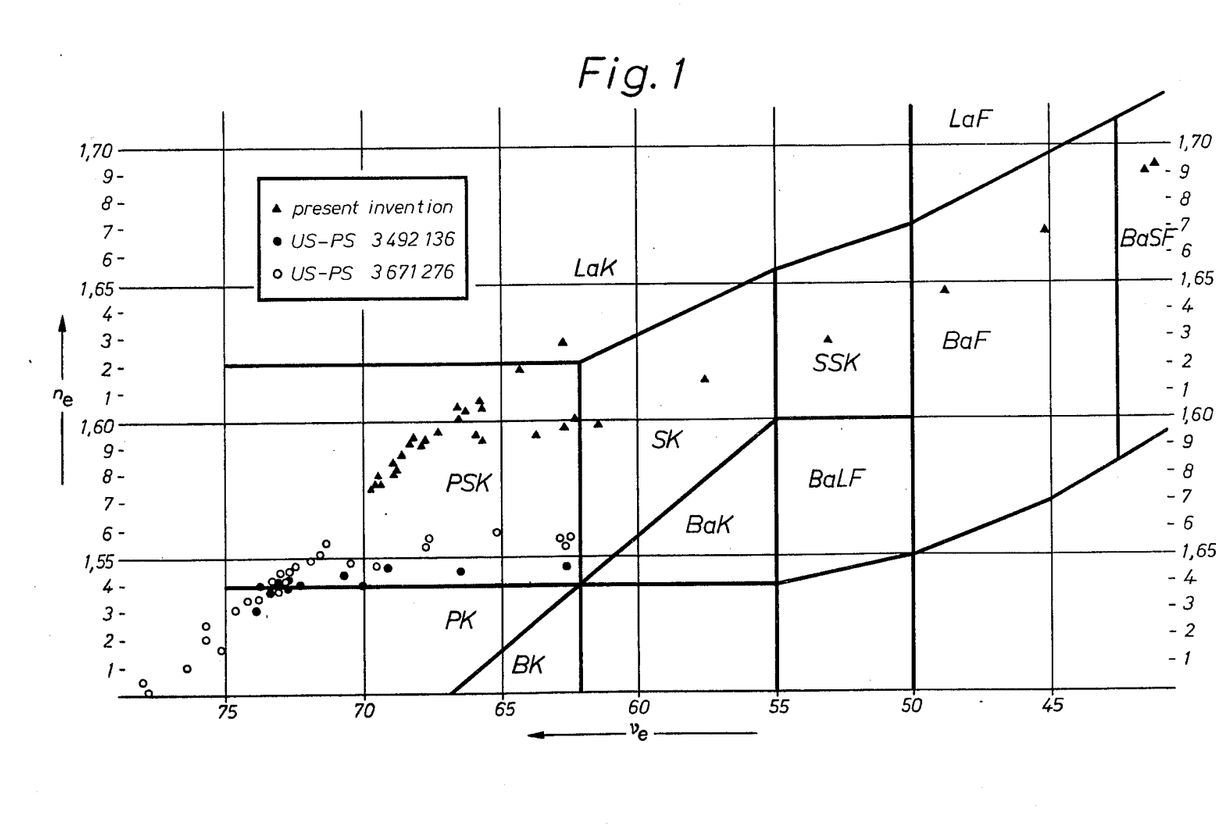
FIG. 1 shows the optical position range of the glasses produced by the process of the present invention in an $n_e$–$v_e$ diagram as compared with known glasses.

The graph illustrated in FIG. 1 shows the index of refraction $n_e$ plotted on the ordinate and the Abbe number $\nu_e$ plotted on the abscissa. In said graph the glasses according to the present invention are indicated by a small solid triangle. Compared therewith the glasses of U.S. Pat. No. 3,492,136 are marked by a solid circle and the glasses of U.S. Pat. No. 3,671,276 are marked by a hollow circle. It is evident that all the examples of glasses according to this invention lie outside those regions of the $n_e$–$\nu_e$ field which are covered by the glasses disclosed in said two U.S. patents. The glasses of the present invention show, without any exception, higher $n_e$ values and in general also lower Abbe numbers.

In the two-dimensional graphical showing of FIG. 1 the third important optical parameter of the fluorophosphate glasses, namely the positive anomalous partial dispersion value $+\Delta\nu_e$, can, of course, not be taken into consideration. Said value becomes evident from FIG. 2. In the graph of said FIG. 2 the $\theta'_g$ value is plotted as ordinate and the Abbe number $\nu_e$ again as abscissa.

Figure 2:
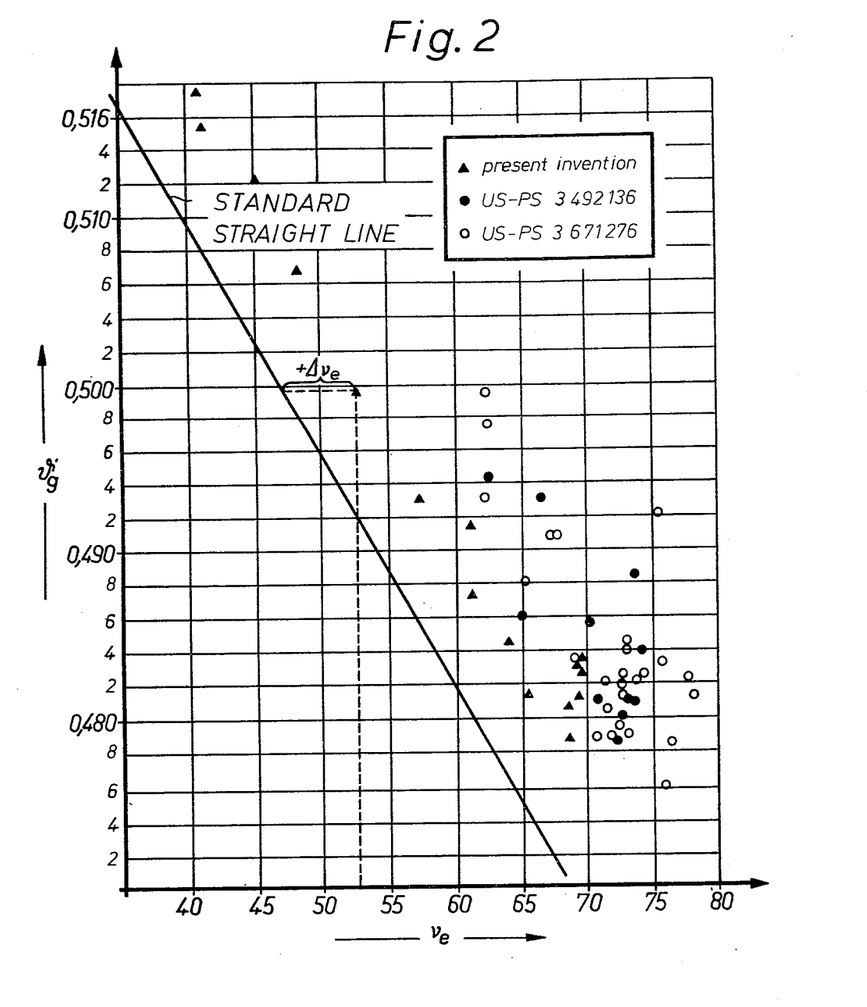
FIG. 2 shows the optical position range of the glasses produced by the process of the present invention in a $\theta'_g$–$v_e$ diagram.

The following mathematical relationship applies to the two values $\theta'_g$ and $\nu_e$:

$$\theta'_g = \frac{n_g - n_{F'}}{n_{F'} - n_{C'}}; \quad \nu_e = \frac{n_e - 1}{n_{F'} - n_{C'}}.$$

In said equations the subscripts e, g, F', and C' stand for concrete standard wavelengths.

The symbols used in FIG. 2 correspond to those used in FIG. 1. It is evident that all the glasses of the present invention lie to the right of the so-called "standard straight line". They, therefore, all have a positive $\Delta\nu_e$, i.e. a $+\Delta\nu_e$ glass has a higher $\nu_e$ value than a "standard" glass.

The following example serves to illustrate the manner in which the glass according to the present invention is produced by melting down a mixture of its components.

EXAMPLE

A well mixed charge, in weight percent, of the following composition is provided:

| | |
|---|---|
| $Mg(PO_3)_2$ | 22.50 % |
| $Ba(PO_3)_2$ | 14.80 % |
| $Al(PO_3)_3$ | 9.30 % |
| $MgF_2$ | 0.44 % |
| $CaF_2$ | 0.53 % |
| $SrF_2$ | 12.20 % |
| $AlF_3$ | 7.50 % |
| $LaF_3$ | 0.53 % |
| $BaO$ | 32.20 % |

The mixture is melted in amounts of 2.5 kg. in a platinum crucible at 1000° C. Thereafter, the melting temperature is increased by about 100° C. to 1100° C. The melt is refined and homogenized at said temperature for 10 to 15 minutes. Thereupon, it is allowed to cool to 800° C. by discontinuing heat supply, while stirring, and is then poured into aluminum molds preheated to 530° C. The temperatures of melting, refining and homogenizing, cooling, and casting the glass component mixture may vary by ±5 %.

It is to be pointed out that additives customarily added in glass technology to the batches of glass component mixtures, for instance, additives for refining of the melt, such as alkali metal meta-arsenates, arsenates, bifluorides, and others in amounts not exceeding about 3 %, by weight, can be added to the glass component mixture without exceeding or substantially varying the scope of the present invention. Mixtures containing such additives which are within the scope of the attached claims thus are also comprised by them.

The temperature-time program as given hereinabove for carrying out the melting procedure represents also merely an example. The melting process can, of course, be modified by a person skilled in the art, depending on the specific charges of glass components employed.

The glasses according to the present invention are especially useful in apochromatically corrected objectives for microscopes and photographic apparatus, especially in telephoto lens systems.

It may be pointed out that the spectral wavelengths or spectral lines $e$, $g$, $F'$, and $C'$ of the equations given hereinabove are, respectively, the following lines:

$e$ = green mercury line of the wavelength of 546.07 nm.

$g$ = blue mercury line of the wavelength of 435.84 nm.

$F'$ = blue cadmium line of the wavelength of 479.99 nm.

$C'$ = red cadmium line of the wavelength of 643.85 nm.

We claim:

1. In a process of producing a fluorophosphate glass having an index of refraction $n_e$ within the range of from about 1.5753 to about 1.6915, an Abbe number $\nu_e$ within the range of from about 41.2 to 69.7, and a relatively high positive anomalous partial dispersion, comprising the steps of a. melting a mixture essentially consisting of the following components, in weight percent:

Fluoride component (a)
  0.1% to 1.5% of magnesium fluoride $MgF_2$,
  0.1% to 1.5% of calcium fluoride $CaF_2$,
  0% to 15.0% of strontium fluoride $SrF_2$,
  0% to 25.0% of barium fluoride $BaF_2$,
  0% to 10.0% of aluminum fluoride $AlF_3$, and
  0.1% to 1.5% of lanthanum fluoride $LaF_3$,
  the total sum of the alkaline earth metal fluorides in said mixture not exceeding 38% and the total sum of all fluorides in said mixture not exceeding 45%.

Metaphosphate component (b)
  8.0% to 12.0% of aluminum metaphosphate $Al(PO_3)_2$,
  3.0% to 25.0% of magnesium metaphosphate $Mg(PO_3)_2$, and
  10.0% to 18.0% of barium metaphosphate $Ba(PO_3)_2$,
  the total sum of the metaphosphates in said mixture not exceeding 50%;

Barium oxide component (c)
  8.0% to 55.0% of barium oxide BaO;

Additional oxide component (d)
  0% to 17.0% of boron trioxide $B_2O_3$,
  0% to 10.0% of germanium dioxide $GeO_2$,
  0% to 4.0% of titanium dioxide $TiO_2$, and
  0% to 20.0% of niobium pentoxide $Nb_2O_5$;

b. homogenizing the molten mixture at a temperature within the range of from about 1000°C. to about 1100°C. with stirring;

c. cooling said molten mixture to about 800°C.; and, d. pouring said mixture into preheated molds.

2. The process of claim 1, in which the mixture consists of the following components, in weight percent:

Fluoride component (a)
  0.4 % to 0.5 % of magnesium fluoride $MgF_2$,
  0.5 % to 0.6 % of calcium fluoride $CaF_2$,
  0 % to 13.0 % of strontium fluoride $SrF_2$,
  0 % to 22.0 % of barium fluoride $BaF_2$,
  0 % to 8.0 % of aluminum fluoride $AlF_3$, and
  0.5 % to 0.6 % of lanthanum fluoride $LaF_3$;
  the total sum of the alkaline earth metal fluorides in said mixture not exceeding the sum of 35 % and the total sum of all fluorides not exceeding 43 %;

Metaphosphate component (b)
  9.0 % to 10.0 % of aluminum metaphosphate $Al(PO_3)_3$,
  4.0 % to 23.0 % of magnesium metaphosphate $Mg(PO_3)_2$, and
  11.0 % to 15.0 % of barium metaphosphate $Ba(PO_3)_2$,
  the total sum of the metaphosphates in said mixture not exceeding 47 %;

Barium oxide component (c)
  10.0 % to 52.0 % of barium oxide BaO; and

Additional oxide component (d)
  0 % to 15.0 % of boron trioxide $B_2O_3$,
  0 % to 8.0 % of germanium dioxide $GeO_2$,
  0 % to 2.0 % of titanium dioxide $TiO_2$, and
  0 % to 18.0 % of niobium pentoxide $Nb_2O_5$.

3. The process of claim 1 in which the mixture consists of the following components, in weight percent:

Fluoride component (a)
  0.44 % of magnesium fluoride $MgF_2$,
  0.53 % of calcium fluoride $CaF_2$,
  0 % to 12.2 % of strontium fluoride $SrF_2$,
  0 % to 21.5 % of barium fluoride $BaF_2$,
  0 % to 7.5 % of aluminum fluoride $AlF_3$, and
  0.53 % of lanthanum fluoride $LaF_3$,
  the total sum of the alkaline earth metal fluorides being at least 0.97 % and not exceeding 34.67 % and the total sum of all fluorides in said mixture being at least 1.5 % and not exceeding 42.7 %;

Metaphosphate component (b)
  9.3 % of aluminum metaphosphate $Al(PO_3)_3$,
  4.5 % to 22.5 % of magnesium metaphosphate $Mg(PO_3)_2$, and
  11.8 % to 14.8 % of barium metaphosphate $Ba(PO_3)_2$,
  the total sum of the metaphosphates in said mixture being at least 28.6 % and not exceeding 46.6 %;

Barium oxide component (c)
  10.7 % to 51.9 % of barium oxide BaO; and

Additional oxide component (d)
  0 % to 15.0 % of boron trioxide $B_2O_3$,
  0 % to 7.5 % of germanium dioxide $GeO_2$,
  0 % to 1.5 % of titanium dioxide $TiO_2$, and
  0 % to 18.0 % of niobium pentoxide $Nb_2O_5$.

4. A batch composition for making fluorophosphate glass having an index of refraction $n_e$ within the range of from about 1.5753 to about 1.6915, an Abbe number $\nu_e$ within the range of from about 41.2 to 69.7, and a relatively high positive anomalous partial dispersion, said composition essentially consisting of the following components, in weight percent:

Fluoride component (a)
  0.1% to 1.5% of magnesium fluoride $MgF_2$,
  0.1% to 1.5% of calcium fluoride $CaF_2$,
  0% to 15.0% of strontium fluoride $SrF_2$,
  0% to 25.0% of barium fluoride $BaF_2$,
  0% to 10.0% of aluminum fluoride $AlF_3$, and
  0.1% to 1.5% of lanthanum fluoride $LaF_3$,
  the total sum of the alkaline earth metal fluorides in said mixture not exceeding 38% and the total sum of all fluorides in said mixture not exceeding 45%;

Metaphosphate component (b)
  8.0% to 12% of aluminum metaphosphate $Al(PO_3)_2$, 3.0% to 25.0% of magnesium metaphosphate Mg(PO₃)₂, and
10.0% to 18.0% of barium metaphosphate Ba(PO₃)₂,
the total sum of the metaphosphates in said mixture not exceeding 50%;
Barium oxide component (c)
8.0% to 55.0% of barium oxide BaO;
Additional oxide component (d)
0% to 17.0% of boron trioxide $B_2O_3$,
0% to 10.0% of germanium dioxide $GeO_2$,
0% to 4.0% of titanium dioxide $TiO_2$, and
0% to 20.0% of niobium pentoxide $Nb_2O_5$.

5. The composition of claim 4, in which the mixture consists of the following components, in weight percent:
Fluoride component (a)
0.4 % to 0.5 % of magnesium fluoride $MgF_2$,
0.5 % to 0.6 % of calcium fluoride $CaF_2$,
0 % to 13.0 % of strontium fluoride $SrF_2$,
0 % to 22.0 % of barium fluoride $BaF_2$,
0 % to 8.0 % of aluminum fluoride $AlF_3$, and
0.5 % to 0.6 % of lanthanum fluoride $LaF_3$;
the total sum of the alkaline earth metal fluorides in said mixture not exceeding the sum of 35 % and the total sum of all fluorides not exceeding 43 %;
Metaphosphate component (b)
9.0 % to 10.0 % of aluminum metaphosphate $Al(PO_3)_3$,
4.0 % to 23.0 % of magnesium metaphosphate $Mg(PO_3)_2$, and
11.0 % to 15.0 % of barium metaphosphate $Ba(PO_3)_2$,
the total sum of the metaphosphates in said mixture not exceeding 47 %;
Barium oxide component (c)
10.0 % to 52.0 % of barium oxide BaO; and
Additional oxide component (d)
0 % to 15.0 % of boron trioxide $B_2O_3$,
0 % to 8.0 % of germanium dioxide $GeO_2$,
0 % to 2.0 % of titanium dioxide $TiO_2$, and
0 % to 18.0 % of niobium pentoxide $Nb_2O_5$.

6. The composition of claim 4, in which the mixture consists of the following components, in weight percent:
Fluoride component (a)
0.44 % of magnesium fluoride $MgF_2$,
0.53 % of calcium fluoride $CaF_2$,
0 % to 12.2 % of strontium fluoride $SrF_2$,
0 % to 21.5 % of barium fluoride $BaF_2$,
0 % to 7.5 % of aluminum fluoride $AlF_3$, and
0.53 % of lanthanum fluoride $LaF_3$,
the total sum of the alkaline earth metal fluorides being at least 0.97 % and not exceeding 34.67 % and the total sum of all fluorides in said mixture being at least 1.5 % and not exceeding 42.7 %;
Metaphosphate component (b)
9.3 % of aluminum metaphosphate $Al(PO_3)_3$,
4.5 % to 22.5 % of magnesium metaphosphate $Mg(PO_3)_2$, and
11.8 % to 14.8 % of barium metaphosphate $Ba(PO_3)_2$,
the total sum of the metaphosphates in said mixture being at least 28.6 % and not exceeding 46.6 %;
Barium oxide component (c)
10.7 % to 51.9 % of barium oxide BaO; and
Additional oxide component (d)
0 % to 15.0 % of boron trioxide $B_2O_3$,
0 % to 7.5 % of germanium dioxide $GeO_2$,
0 % to 1.5 % of titanium dioxide $TiO_2$, and
0 % to 18.0 % of niobium pentoxide $Nb_2O_5$.

7. The composition of claim 4, in which the mixture consists of the following components, in weight percent:
Fluoride component (a)
0.44 % of magnesium fluoride $MgF_2$,
0.53 % of calcium fluoride $CaF_2$,
12.20 % of strontium fluoride $SrF_2$,
7.50 % of aluminum fluoride $AlF_3$, and
0.53 % of lanthanum fluoride $LaF_3$;
Metaphosphate component (b)
9.30 % of aluminum metaphosphate $Al(PO_3)_3$,
22.50 % of magnesium metaphosphate $Mg(PO_3)_2$, and
14.80 % of barium metaphosphate $Ba(PO_3)_2$; and
Barium oxide component (c)
32.20 % of barium oxide BaO.

8. The composition of claim 4, in which the mixture consists of the following components, in weight percent:
Fluoride component (a)
0.44 % of magnesium fluoride $MgF_2$,
0.53 % of calcium fluoride $CaF_2$,
12.20 % of strontium fluoride $SrF_2$,
7.50 % of aluminum fluoride $AlF_3$, and
0.53 % of lanthanum fluoride $LaF_3$;
Metaphosphate component (b)
9.30 % of aluminum metaphosphate $Al(PO_3)_3$,
22.50 % of magnesium metaphosphate $Mg(PO_3)_2$, and
14.80 % of barium metaphosphate $Ba(PO_3)_2$;
Barium oxide component (c)
29.20 % of barium oxide BaO; and
Additional oxide component (d)
3.00 % of germanium oxide $GeO_2$.

9. A fluorophosphate glass having an index of refraction $n_e$ within the range of from about 1.5753 to about 1.6267, an Abbe number $\nu_e$ within the range of from about 61.4 to about 69.7, and a relatively high positive anomalous partial dispersion, said glass being produced by melting a mixture essentially consisting of the following components, in weight percent:
Fluoride component (a)
0.1% to 1.5% of magnesium fluoride $MgF_2$,
0.1% to 1.5% of calcium fluoride $CaF_2$,
0% to 15.0% of strontium fluoride $SrF_2$,
0% to 25.0% of barium fluoride $BaF_2$,
0% to 10.0% of aluminum fluoride $AlF_3$, and
0.1% to 1.5% of lanthanum fluoride $LaF_3$,
the total sum of the alkaline earth metal fluorides in said mixture not exceeding 38% and the total sum of all fluorides in said mixture not exceeding 45%;
Metaphosphate component (b)
8.0% to 12% of aluminum metaphosphate $Al(PO_3)_2$,
3.0% to 25.0% of magnesium metaphosphate $Mg(PO_3)_2$, and
10.0% to 18.0% of barium metaphosphate $Ba(PO_3)_2$,
the total sum of the metaphosphates in said mixture not exceeding 50%;
Barium oxide component (c)
8.0% to 55.0% of barium oxide BaO;
Additional oxide component (d)
0% to 17.0% of boron trioxide $B_2O_3$,
0% to 10.0% of germanium dioxide $GeO_2$, and 0% to 4.0% of titanium dioxide $TiO_2$.

10. The fluorophosphate glass of claim 9, in which the mixture consists of the following components, in weight percent:

Fluoride component (a)
  0.4% to 0.5% of magnesium fluoride $MgF_2$,
  0.5% to 0.6% of calcium fluoride $CaF_2$,
  0% to 13.0% of strontium fluoride $SrF_2$,
  0% to 22.0% of barium fluoride $BaF_2$,
  0% to 8.0% of aluminum fluoride $AlF_3$, and
  0.5% to 0.6% of lanthanum fluoride $LaF_3$;
  the total sum of the alkaline earth metal fluorides in said mixture not exceeding the sum of 35% and the total sum of all fluorides not exceeding 43%;
Metaphosphate component (b)
  9.0% to 10.0% of aluminum metaphosphate $Al(PO_3)_3$,
  4.0% to 23.0% of magnesium metaphosphate $Mg(PO_3)_2$, and
  11.0% to 15.0% of barium metaphosphate $Ba(PO_3)_2$,
  the total sum of the metaphosphates in said mixture not exceeding 47%;
Barium oxide component (c)
  10.0% to 52.0% of barium oxide BaO; and
Additional oxide component (d)
  0% of boron trioxide $B_2O_3$,
  0% to 8.0% of germanium dioxide $GeO_2$,
  0% to 2.0% of titanium dioxide $TiO_2$.

11. The fluorophosphate glass of claim 9, in which the mixture consists of the following components, in weight percent:

Fluoride component (a)
  0.44% of magnesium fluoride $MgF_2$,
  0.53% of calcium fluoride $CaF_2$,
  0% to 12.2% of strontium fluoride $SrF_2$,
  0% to 21.5% of barium fluoride $BaF_2$,
  0% to 7.5% of aluminum fluoride $AlF_3$, and
  0.53% of lanthanum fluoride $LaF_3$,
  the total sum of the alkaline earth metal fluorides being at least 0.97% and not exceeding 34.67% and the total sum of all fluorides in said mixture being at least 1.5% and not exceeding 42.7%;
Metaphosphate component (b)
  9.3% of aluminum metaphosphate $Al(PO_3)_3$,
  4.5% to 22.5% of magnesium metaphosphate $Mg(PO_3)_2$, and
  11.8% to 14.8% of barium metaphosphate $Ba(PO_3)_2$,
  the total sum of the metaphosphates in said mixture being at least 28.6% and not exceeding 46.6%;
Barium oxide component (c)
  10.7% to 51.9% of barium oxide BaO; and
Additional oxide component (d):
  0% to 15.0% of boron trioxide $B_2O_3$,
  0% to 7.5% of germanium dioxide $GeO_2$,
  0% to 1.5% of titanium dioxide $TiO_2$.

12. The fluorophosphate glass of claim 9, in which the mixture consists of the following components, in weight percent:

Fluoride component (a)
  0.44% of magnesium fluoride $MgF_2$,
  0.53% of calcium fluoride $CaF_2$,
  12.20% of strontium fluoride $SrF_2$,
  7.50% of aluminum fluoride $AlF_3$, and
  0.53% of lanthanum fluoride $LaF_3$;
Metaphosphate component (b)
  9.30% of aluminum metaphosphate $Al(PO_3)_3$,
  22.50% of magnesium metaphosphate $Mg(PO_3)_2$, and
  14.80% of barium metaphosphate $Ba(PO_3)_2$; and
Barium oxide component (c)
  32.20% of barium oxide BaO.

13. The fluorophosphate glass of claim 9, in which the mixture consists of the following components, in weight percent:

Fluoride component (a)
  0.44% of magnesium fluoride $MgF_2$,
  0.53% of calcium fluoride $CaF_2$,
  12.20% of strontium fluoride $SrF_2$,
  7.50% of aluminum fluoride $AlF_3$, and
  0.53% of lanthanum fluoride $LaF_3$;
Metaphosphate component (b)
  9.30% of aluminum metaphosphate $Al(PO_3)_3$,
  22.50% of magnesium metaphosphate $Mg(PO_3)_2$, and
  14.80% of barium metaphosphate $Ba(PO_3)_2$;
Barium oxide component (c)
  29.20% of barium oxide BaO; and
Additional oxide component (d)
  3.00% of germanium oxide $GeO_2$.

14. A fluorophosphate glass having an index of refraction $n_e$, within the range of from about 1.5974 to 1.6915, an Abbe number $\nu_e$ within the range of from about 41.2 to 62.7 and a relatively high positive anomalous partial dispersion, said glass being produced by melting a mixture essentially consisting of the following components, in weight percent:

Fluoride component (a)
  0.1% to 1.5% of magnesium fluoride $MgF_2$,
  0.1% to 1.5% of calcium fluoride $CaF_2$,
  0% to 15.0% of strontium fluoride $SrF_2$,
  0% to 25.0% of barium fluoride $BaF_2$,
  0% to 10.0% of aluminum fluoride $AlF_3$, and
  0.1% to 1.5% of lanthanum fluoride $LaF_3$,
  the total sum of the alkaline earth metal fluorides in said mixture not exceeding 38% and the total sum of all fluorides in said mixture not exceeding 45%;
Metaphosphate component (b)
  8.0% to 12% of aluminum metaphosphate $Al(PO_3)_2$,
  3.0% to 25.0% of magnesium metaphosphate $Mg(PO_3)_2$, and
  10.0% to 18.0% of barium metaphosphate $Ba(PO_3)_2$,
  the total sum of the metaphosphates in said mixture not exceeding 50%;
Barium oxide component (c)
  8.0% to 55.0% of barium oxide BaO;
Additional oxide component (d)
  0% to 17.0% of boron trioxide $B_2O_3$,
  0% to 10.0% of germanium dioxide $GeO_2$,
  0% to 4.0% of titanium dioxide $TiO_2$, and
  3.0% to 18.0% of niobium pentoxide $Nb_2O_5$.

15. The fluorophosphate glass of claim 14, in which the mixture consists of the following components, in weight percent:

Fluoride component (a)
  0.44% of magnesium fluoride $MgF_2$,
  0.53% of calcium fluoride $CaF_2$,
  0% to 12.2% of strontium fluoride $SrF_2$,
  0% to 21.5% of barium fluoride $BaF_2$,
  0% to 7.5% of aluminum fluoride $AlF_3$, and
  0.53% of lanthanum fluoride $LaF_3$,
  the total sum of the alkaline earth metal fluorides being at least 0.97% and not exceeding 34.67% and the total sum of all fluorides in said mixture being at least 1.5% and not exceeding 42.7%;

Metaphosphate component (b)
9.3% of aluminum metaphosphate Al(PO$_3$)$_3$,
4.5% to 22.5% of magnesium metaphosphate Mg(PO$_3$)$_2$, and
11.8% to 14.8% of barium metaphosphate Ba(PO$_3$)$_2$,
the total sum of the metaphosphates in said mixture being at least 28.6% and not exceeding 46.6%;

Barium oxide component (c)
32.2% of barium oxide BaO; and

Additional oxide component (d)
0% to 15.0% of boron trioxide B$_2$O$_3$,
0% to 15.0% of boron trioxide B$_2$O$_3$,
0% to 7.5% of germanium dioxide GeO$_2$,
0% to 1.5% of titanium dioxide TiO$_2$, and
3.0% to 18.0% of niobium pentoxide Nb$_2$O$_5$.

16. The fluorophosphate glass of claim 15, in which the mixture consists of the following components, in weight percent:

Fluoride component (a)
0.44% of magnesium fluoride MgF$_2$,
0.53% of calcium fluoride CaF$_2$,
12.20% of strontium fluoride SrF$_2$,
7.5% of aluminum fluoride AlF$_3$, and
0.53% of lanthanum fluoride LaF$_3$;

Metaphosphate component (b)
9.3% of aluminum metaphosphate Al(PO$_3$)$_3$,
4.5% to 22.5% of magnesium metaphosphate Mg(PO$_3$)$_2$, and
11.8% to 14.8% of barium metaphosphate Ba(PO$_3$)$_2$,
the total sum of the metaphosphates in said mixture being at least 28.6% and not exceeding 46.60%;

Barium oxide component (c)
32.2% of barium oxide BaO; and

Additional oxide component (d)
3.0% to 18.0% of niobium pentoxide Nb$_2$O$_5$.

* * * * *

UNITED STATES PATENT OFFICE
CERTIFICATE OF CORRECTION

Page 1 of 2

Patent No. 3,954,484     Dated May 4, 1976

Inventor(s) HEINZ BROEMER and NORBERT MEINERT

It is certified that error appears in the above-identified patent and that said Letters Patent are hereby corrected as shown below:

Column 2, lines 14 and 48; column 7, line 39; column 8, lines 5 and 67; column 9, line 28; column 10, line 56; column 11, line 16; column 12, line 42:
" Al(- " should be canceled.

Column 2, lines 15 and 49; column 7, line 40; column 8, lines 6 and 68; column 9, line 29; column 10, line 57; column 11, line 17; column 12, line 43:
" $PO_3)_3$ " should read -- $Al(PO_3)_3$ --.

Column 2, lines 18 and 52; column 3, line 18; column 7, line 43; column 8, lines 9 and 28; column 9, lines 32 and 61; column 10, line 60; column 11, lines 20 and 48; column 12, line 46; column 13, line 8; column 14, line 13:
" Ba(- " should be canceled.

Column 2, lines 19 and 53; column 3, line 19; column 7, line 44; column 8, lines 10 and 29; column 9, lines 33 and 62; column 10, line 61; column 11, lines 21 and 49; column 12, line 47; column 13, line 9; column 14, line 14:
" $PO_3)_2$" should read -- $Ba(PO_3)_2$ --.

Column 2, line 62: "germamium" should read -- germanium --.
Columns 3 and 4, Table: In the column of Melt No. 15a, the number -- 0.53 -- should be inserted in the line indicating the $CaF_2$ content.
In the column following Melt No. 27, the number "0.53" should be canceled.

UNITED STATES PATENT OFFICE
CERTIFICATE OF CORRECTION

Patent No. 3,954,484         Dated May 4, 1976

Inventor(s) HEINZ BROEMER and NORBERT MEINERT

It is certified that error appears in the above-identified patent and that said Letters Patent are hereby corrected as shown below:

Column 5, line 62, second equation: " $n_F$" " should read -- $n_{F'}$ --.

Signed and Sealed this

Twenty-fourth Day of August 1976

[SEAL]

Attest:

RUTH C. MASON
Attesting Officer

C. MARSHALL DANN
Commissioner of Patents and Trademarks